(12) United States Patent
Toyooka et al.

(10) Patent No.: US 11,878,652 B2
(45) Date of Patent: Jan. 23, 2024

(54) VEHICLE REMOTE CONTROL SYSTEM

(71) Applicant: GLOBAL MOBILITY SERVICE INC., Tokyo (JP)

(72) Inventors: Hiraku Toyooka, Tokyo (JP); Keita Danjyo, Tokyo (JP); Katsuyoshi Kurahashi, Tokyo (JP)

(73) Assignee: GLOBAL MOBILITY SERVICE INC., Tokyo (JP)

( * ) Notice: Subject to any disclaimer, the term of this patent is extended or adjusted under 35 U.S.C. 154(b) by 44 days.

(21) Appl. No.: 17/575,586

(22) Filed: Jan. 13, 2022

(65) Prior Publication Data

US 2022/0134996 A1    May 5, 2022

Related U.S. Application Data

(63) Continuation of application No. 16/472,463, filed as application No. PCT/JP2016/088589 on Dec. 22, 2016, now Pat. No. 11,254,287.

(51) Int. Cl.
*B60R 25/04* (2013.01)
*B60R 16/023* (2006.01)
(Continued)

(52) U.S. Cl.
CPC .......... *B60R 25/04* (2013.01); *B60R 16/0231* (2013.01); *B60R 16/03* (2013.01);
(Continued)

(58) Field of Classification Search
CPC ..... B60R 25/04; B60R 16/0231; B60R 16/03; B60R 25/2063; B60R 25/24; B60R 25/33;
(Continued)

(56) References Cited

U.S. PATENT DOCUMENTS

| 5,949,151 A | 9/1999 | Nakajima |
| 6,351,703 B1 | 2/2002 | Avery, Jr. |

(Continued)

FOREIGN PATENT DOCUMENTS

| JP | H1089217 A | 4/1998 |
| JP | 200259812 A | 2/2002 |

(Continued)

OTHER PUBLICATIONS

International Search Report in PCT/JP2016/088589, dated Feb. 28, 2017, 4pp.

(Continued)

*Primary Examiner* — Tyler D Paige
(74) *Attorney, Agent, or Firm* — HAUPTMAN HAM, LLP

(57) ABSTRACT

A vehicle-mounted device includes vehicle information detecting unit for detecting an on/off state of vehicle power, relay input/output unit for controlling an external relay configured to make a switch between a starting-disabled state and a starting-enabled state of a vehicle, and vehicle information-associated control unit for controlling the external relay based on a relay control command. The vehicle information-associated control unit controls the external relay based on an elapsed time since a change in the on/off state of vehicle power detected by the vehicle information detecting unit.

3 Claims, 6 Drawing Sheets

(51) Int. Cl.
*B60R 25/20* (2013.01)
*B60R 16/03* (2006.01)
*B60R 25/24* (2013.01)
*B60R 25/33* (2013.01)
*B60R 25/34* (2013.01)
*B60R 25/40* (2013.01)
*G05D 1/00* (2006.01)

(52) U.S. Cl.
CPC .......... *B60R 25/2063* (2013.01); *B60R 25/24* (2013.01); *B60R 25/33* (2013.01); *B60R 25/34* (2013.01); *B60R 25/403* (2013.01); *G05D 1/0016* (2013.01); *B60R 2325/105* (2013.01)

(58) Field of Classification Search
CPC . B60R 25/34; B60R 25/403; B60R 2325/105; B60R 2025/0405; B60R 25/102; G05D 1/0016; H04Q 9/00
USPC .......................................................... 701/2
See application file for complete search history.

(56) References Cited

U.S. PATENT DOCUMENTS

| | | |
|---|---|---|
| 9,104,537 B1 | 8/2015 | Penilla et al. |
| 2002/0027501 A1 | 3/2002 | Yamanaka et al. |
| 2004/0098179 A1 | 5/2004 | Sokoloski et al. |
| 2005/0171663 A1 | 8/2005 | Mittelsteadt et al. |
| 2006/0265235 A1 | 11/2006 | Schuchardt et al. |
| 2007/0185728 A1 | 8/2007 | Schwarz et al. |
| 2011/0270772 A1 | 11/2011 | Hall et al. |
| 2013/0132268 A1 | 5/2013 | Cooper et al. |
| 2015/0298653 A1 | 10/2015 | Schwartz |
| 2017/0164267 A1 | 6/2017 | Marka et al. |
| 2017/0200329 A1 | 7/2017 | Rajakondala |
| 2017/0200331 A1* | 7/2017 | Kumar ..................... G07C 5/02 |
| 2018/0121903 A1 | 5/2018 | Al Salah |
| 2019/0147419 A1 | 5/2019 | Terkel |

FOREIGN PATENT DOCUMENTS

| | | |
|---|---|---|
| JP | 2002255014 A | 9/2002 |
| JP | 3597772 B2 | 12/2004 |
| JP | 200880968 A | 4/2008 |
| JP | 2010143581 A | 7/2010 |
| JP | 4534455 B2 | 9/2010 |
| JP | 201485758 A | 5/2014 |
| JP | 2014146120 A | 8/2014 |
| WO | 2016167350 A1 | 10/2016 |

OTHER PUBLICATIONS

Office Action in CL application No. 2019-001673 dated Feb. 28, 2020, 33pp.

Office Action in CL application No. 2019-001673 dated Jun. 17, 2020, 28pp.

Office Action in U.S. Appl. No. 17/936,386, dated Jul. 19, 2023, 21pp.

* cited by examiner

FIG. 3A

RELAY A

| STATE | RELAY VALUE |
|---|---|
| Open | 0 |
| Close | 1 |

| COMBINATION | STATUS | VEHICLE STATE |
|---|---|---|
| 0 0 | STARTING-ENABLED STATE | STARTING POSSIBLE |
| 0 1 | STARTING-DISABLED STATE | STARTING IMPOSSIBLE |

FIG. 3B

RELAY A

| STATE | RELAY VALUE |
|---|---|
| Open | 0 |
| Close | 1 |

RELAY B

| STATE | RELAY VALUE |
|---|---|
| Open | 0 |
| Close | 1 |

| COMBINATION | STATUS | VEHICLE STATE |
|---|---|---|
| 0 0 | STARTING-ENABLED STATE | STARTING POSSIBLE |
| 0 1 | UNINTENDED VALUE | STARTING POSSIBLE |
| 1 0 | UNINTENDED VALUE | STARTING POSSIBLE |
| 1 1 | STARTING-DISABLED STATE | STARTING IMPOSSIBLE |

FIG. 4

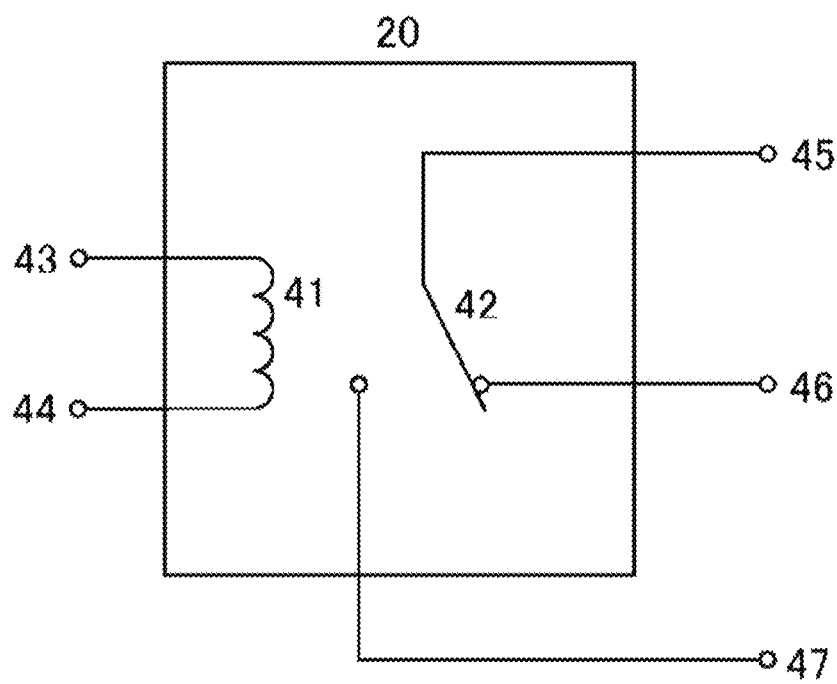

FIG. 9

| KIND OF VEHICLE | EQUIPPED WITH IMMOBILIZER | | NOT EQUIPPED WITH IMMOBILIZER | |
|---|---|---|---|---|
| | KEY TYPE | PUSH TYPE | KEY TYPE | PUSH TYPE |
| INTERNAL COMBUSTION ENGINE VEHICLE | A/B | A/B/C | A | A/C |
| EV | NOT EXIST | B/C | NOT EXIST | C |
| PARALLEL HEV | B | B/C | NOT SUPPORTED | C |
| SERIES HEV | B | B/C | NOT SUPPORTED | C |
| SERIES-PARALLEL HEV | B | B/C | NOT SUPPORTED | C |

A : CUT ST LINE
B : DISABLE KEY AUTHENTICATION
C : INVALIDATE PUSH BUTTON

VEHICLE REMOTE CONTROL SYSTEM

RELATED APPLICATIONS

The present application is a continuation application of U.S. application Ser. No. 16/472,463, filed Jun. 21, 2019, which is a national phase of International Application Number PCT/JP2016/088589, filed Dec. 22, 2016.

FIELD

The present invention relates to a vehicle remote control system for use in services that provide a vehicle equipped with a vehicle-mounted device with a remote control function.

BACKGROUND

In the conventional automobile distribution and leasing industry, people have been unable to obtain vehicles without passing strict finance credit screening. Nowadays, a service has been proposed to users who have the ability to pay but fail to pass a conventional credit screening. This service eliminates credit screening but provides a vehicle and, if the charge (for example, monthly fee) is not paid within a predetermined time limit, remotely stops the vehicle and specifies the position of the vehicle for vehicle retrieval.

An example of a system for implementing such a service is disclosed in Patent Literature 1, in which a vehicle is equipped with a vehicle-mounted device with a remote control function, and this vehicle-mounted device is connected to a network so that a server remotely controls the vehicle or a server acquires information on the vehicle. Such a vehicle connected to a network is called a "connected car". In this system, if the user does not pay the charge within a predetermined time limit, or if theft of the vehicle is detected, the starting of the vehicle is restricted under an instruction from the server, for example, when the following conditions are satisfied:

the present position of the vehicle is a particular location or within a particular range;
the engine of the vehicle is not being started; and
a certain time has elapsed since the vehicle was stopped or parked.

Patent Literature 2 discloses a remote control system for auto loan and auto lease, in which a relay switch device is controlled such that the starting of the engine of a target vehicle is disabled when the loan payment or the lease fee is not settled, and the relay switch device is also controlled such that a lock state is entered to disable the starting of the engine when the transmission/reception antenna or the GPS antenna is removed.

Patent Literature 3 to Patent Literature 5 disclose techniques for performing control such that the starting of a vehicle is disabled by remote operation in anti-theft devices.

Patent Literature 3 discloses an antitheft system for construction machines using a satellite, in which at a point in time when a construction machine is found stolen, a stop signal is transmitted from a personal computer terminal of the manager of the construction machine to a satellite communication unit of the construction machine through a satellite, whereby the construction machine at a remote location is controlled such that the starting of the engine is disabled, or the engine is stopped, or the hydraulic operation of the machine is disabled. In addition, even if an illegal intruder succeeds in starting the engine by directly connecting the battery with the engine starter motor using a cable, the control that disables the hydraulic operation of each pilot valve prevents the construction machine from being operated.

Patent Literature 4 discloses a vehicle remote operation system in which a request signal is transmitted from a mobile phone to a communication ECU of the vehicle through a radio base station, and a remote ECU that receives the request signal from the communication ECU disables the use of a specific one of the devices mounted on the vehicle, whereby effective measures against theft can be taken even when the key of the vehicle is stolen. In this system, the remote ECU is connected to ECUs such as a door lock ECU, an immobilizer ECU, and a smart ECU through a vehicle LAN.

Patent Literature 5 discloses a vehicle antitheft system in which when a theft alarm signal is transmitted from a mobile phone to an antitheft control circuit on the vehicle through an antitheft service center, the antitheft control circuit supplies an engine restart-prohibiting signal command to an engine control circuit, under the condition that the vehicle speed is "0", and sets the engine to a restarting-disabled state.

CITATION LIST

Patent Literature

Patent Literature 1: WO2016/167350A1
Patent Literature 2: Japanese Patent Application Laid-open No. 2014-146120
Patent Literature 3: Japanese Patent No. 3597772
Patent Literature 4: Japanese Patent No. 4534455
Patent Literature 5: Japanese Patent Application Laid-open No. 2002-59812

SUMMARY

Technical Problem

Patent Literature 1 merely illustrates a communication scheme such as CAN for the communication method between vehicle-mounted devices, that is, the MCCS and the ECU/VCU, and does not disclose a specific wiring method therefor. Controller Area Network (CAN), as well as Local Interconnect Network (LIN) and FlexRay, is one of the protocols widely used for vehicle-mounted control networks and is mounted on many vehicles on sale now. It is, however, pointed out that CAN is vulnerable to security risk. An example of attacks to CAN is message spoofing, which has been proven to allow unauthorized control such as manipulation of indicator display and disabling of the brake.

Vehicles are accompanied with a vehicular self-diagnosis function called OBD2 (On-Board Diagnostics second generation). In a case of a vehicle trouble, one can connect to OBD2 using a special device to determine which part of the vehicle has a malfunction (for example, a failure in the injection circuit). In recent years, many of telematics terminals connect to OBD2 described above to sense CAN information on OBD2 (for example, fuel information, speed information, etc.) for servers. A case was discovered in which the vulnerability of telematics terminals allowed an attacker to intrude into an in-vehicle network through wireless communication and remotely control the vehicle. This leads us to recognize the risk of the telematics terminals using OBD2. The telematics terminals therefore have been required to perform information sensing without using OBD2 ports.

Patent Literature 1 also provides a list of conditions (1) to (11) for restricting the starting, including that "the engine of the vehicle is not being started". Patent Literature 1 describes "any combination of any number of conditions (1) to (11) can be used. In this case, the AND condition and the OR condition can be selectively used as appropriate." (see paragraph [0029]) but discloses no further details of the conditions. The conditions for restricting the restarting may not therefore necessarily include consideration for the vehicle safety.

In Patent Literature 2, there is no consideration as to the safety of a case where a command to disable the starting of the engine is received while the vehicle is running or during starting of the engine. Furthermore, no measures are envisaged against an error of alteration of control values of the relay switch device due to a malfunction of firmware. If a control value of the relay switch is altered by error to a value that disables the starting of the engine, the legitimate use by the user may be hindered. In Patent Literature 2, when the transmission/reception antenna or the GPS antenna is removed, the relay switch device is controlled such that a lock state is always set to disable the starting of the engine. However, in the event of an emergency, the manager may wish to enable the operation of the vehicle by removing the wiring of the engine starting update control device. Patent Literature 2 does not satisfy such a need.

Patent Literature 3 to Patent Literature 5 do not consider the restarting from the vehicle operation-prohibited state and, for example, do not discuss how to restart the construction machine from a remote location when the communication status is not favorable.

Moreover, Patent Literature 3 and Patent Literature 4 do not discuss the safety of a case where a signal to prohibit operation is received while the vehicle is running or during starting of the engine. In Patent Literature 5, the operation is prohibited under the condition that the vehicle speed is "0". However, the operation-prohibited state may be entered on the road, which may hinder the other traffic.

In Patent Literature 4, the remote ECU is connected to the ECUs mounted on the vehicle through a cable for the vehicle LAN. In this respect, the system is vulnerable to security risk.

In view of the problems of Patent Literature 1 to Patent Literature 5 described above, an object of the subject application is to provide a vehicle remote control system that can prevent a vehicle from entering a starting-disabled state in a dangerous place or in a place where the vehicle obstructs people, considering the safety of the vehicle, when a vehicle is changed to a starting-disabled state under an instruction from a server in a case where the charge is not paid within a predetermined time limit or in a case where a theft is detected.

Another object of the subject application is to provide a vehicle remote control system that can prevent unintentional disablement of the starting due to a malfunction of on-vehicle firmware and thus hinderance to the legitimate use.

Yet another object of the subject application is to provide a vehicle remote control system that can eliminate the vulnerability to security risk in the communication of a vehicle-mounted device.

Yet another object of the subject application is to provide a vehicle remote control system that can select between setting a vehicle to a starting-disabled state and setting a vehicle to a starting-enabled state as needed by the manager when a vehicle-mounted device is removed on purpose or wiring is removed or cut off.

Solution to Problem

The objects of the present invention can be achieved by the following configurations. More specifically, a first aspect of the present invention provides a vehicle-mounted device including: communication means for receiving, from a server, a relay control command to make a switch between a starting-disabled state and a starting-enabled state of a vehicle; vehicle information detecting means for detecting at least an on/off state of vehicle power; relay input/output means for controlling an external relay configured to make a switch between the starting-disabled state and the starting-enabled state of the vehicle; and vehicle information-associated control means for controlling the external relay based on the relay control command. The vehicle information-associated control means determines whether to employ the relay control command, based on an elapsed time since a change in the on/off state of vehicle power detected by the vehicle information detecting means.

According to a second aspect of the present invention, in the vehicle-mounted device of the first aspect, the vehicle information-associated control means does not perform control based on the relay control command when the on/off state of vehicle power detected by the vehicle information detecting means is on or when a time equal to or longer than a predetermined relay change-prohibited period has not elapsed since turning off of the on/off state of vehicle power.

According to a third aspect of the present invention, in the vehicle-mounted device of the second aspect, the vehicle information-associated control means employs the relay control command when a time equal to or longer than the relay change-prohibited period has elapsed since turning off of the on/off state of vehicle power detected by the vehicle information detecting means, and after employing the relay control command, when the vehicle power is on at a point in time when a predetermined vehicle power on/off state reevaluation period has elapsed, the vehicle information-associated control means controls the external relay to a starting-enabled state.

According to a fourth aspect of the present invention, in the vehicle-mounted device of the first aspect, when communication with the server by the communication means fails to be established, the external relay is controlled to a starting-enabled state.

A fifth aspect of the present invention provides a vehicle including the vehicle-mounted device of the first aspect.

A sixth aspect of the present invention provides a vehicle remote control system including the vehicle-mounted device of the first aspect.

According to a seventh aspect of the present invention, in the vehicle remote control system of the sixth aspect, the external relay is inserted to any one of an engine starting control line, a signal line for an ID code on a transponder side received by the vehicle from a transponder in an immobilizer, a signal line for an ID code on the vehicle side in an immobilizer, and wiring of a push button for starting.

According to an eighth aspect of the present invention, in the vehicle remote control system of the sixth aspect, the server acquires vehicle information from the vehicle-mounted device and, when it is determined that the vehicle is in a safe state, transmits the relay control command to the vehicle-mounted device.

A ninth aspect of the present invention provides
a method of controlling a vehicle-mounted device, including: communication means for receiving, from a server, a relay control command to make a switch between a starting-disabled state and a starting-enabled state of a vehicle; vehicle information detecting means for detecting at least an on/off state of vehicle power; relay input/output means for controlling an external relay configured to make a switch between the starting-disabled state and the starting-enabled state of the vehicle; and vehicle information-associated control means for controlling the external relay based on the relay control command. The vehicle information-associated control means determines whether to employ the relay control command, based on an elapsed time since a change in the on/off state of vehicle power detected by the vehicle information detecting means.

A tenth aspect of the present invention provides a program for a vehicle-mounted device, including: a step of receiving, from a server, a relay control command to make a switch between a starting-disabled state and a starting-enabled state of a vehicle; a step of detecting at least an on/off state of vehicle power; a step of controlling an external relay configured to make a switch between the starting-disabled state and the starting-enabled state of the vehicle; and a vehicle information-associated control step of controlling the external relay based on the relay control command. In the vehicle information-associated control step, whether to employ the relay control command is determined, based on an elapsed time since a change in the detected on/off state of vehicle power.

An eleventh aspect of the present invention provides a vehicle-mounted device including: communication means for receiving, from a server, a relay control command to make a switch between a starting-disabled state and a starting-enabled state of a vehicle; relay input/output means for controlling an external relay configured to make a switch between the starting-disabled state and the starting-enabled state of the vehicle based on the relay control command and detecting a state of the external relay; and a relay monitoring unit configured to monitor the state of the external relay detected by the relay input/output means and output a control command for the external relay to the relay input/output means. When the relay state of the external relay detected by the relay input/output means is a predetermined state, the relay monitoring unit sets the external relay to a state different from the predetermined state.

According to a twelfth aspect of the present invention, in the vehicle-mounted device of the eleventh aspect, the relay monitoring unit monitors the relay state of the external relay when the relay state of the external relay is supposed to be a starting-enabled state, and when the relay state of the external relay is a state other than a starting-enabled state in the monitoring, the relay monitoring unit changes the relay state of the external relay to a starting-enabled state.

According to a thirteenth aspect of the present invention, in the vehicle-mounted device of the twelfth aspect, the relay monitoring unit determines that the relay state is supposed to be a starting-enabled state when the relay control command is a starting-enabled state or in an initial state.

According to a fourteenth aspect of the present invention, in the vehicle-mounted device of the twelfth aspect, the vehicle-mounted device further includes a memory configured to store a vehicle type-basis starting-enable relay value, and the relay monitoring unit determines whether the relay state is a starting-enabled state, using the vehicle type-basis starting-enable relay value.

According to a fifteenth aspect of the present invention, in the vehicle-mounted device of the eleventh aspect, when communication with the server by the communication means fails to be established, the external relay is controlled to the starting-enabled state.

A sixteenth aspect of the present invention provides a vehicle including the vehicle-mounted device of the eleventh aspect.

A seventeenth aspect of the present invention provides a vehicle remote control system including the vehicle-mounted device of the eleventh aspect.

According to an eighteenth aspect of the present invention, in the vehicle remote control system of the seventeenth aspect, the external relay is inserted to any one of an engine starting control line, a signal line for an ID code on a transponder side received by the vehicle from a transponder in an immobilizer, a signal line for an ID code on the vehicle side in an immobilizer, and wiring of a push button for starting.

According to a nineteenth aspect of the present invention, in the vehicle remote control system of the seventeenth aspect, the vehicle-mounted device further includes detection means for detecting vehicle information, and the server acquires vehicle information from the detection means in the vehicle-mounted device and, when it is determined that the vehicle is in a safe state, transmits the relay control command to the vehicle-mounted device.

A twentieth aspect of the present invention provides a method of controlling a vehicle-mounted device, including: communication means for receiving, from a server, a relay control command to make a switch between a starting-disabled state and a starting-enabled state of a vehicle; relay input/output means for controlling an external relay configured to make a switch between the starting-disabled state and the starting-enabled state of the vehicle based on the relay control command and detecting a state of the external relay; and relay monitoring unit configured to monitor the state of the external relay detected by the relay input/output means and output a control command for the external relay to the relay input/output means. When the relay state detected by the relay input/output means is a predetermined state, the relay monitoring unit sets the external relay to a state different from the predetermined state.

A twenty-first aspect of the present invention provides a program for a vehicle-mounted device, including: a step of receiving, from a server, a relay control command to make a switch between a starting-disabled state and a starting-enabled state of a vehicle; a step of controlling an external relay configured to make a switch between the starting-disabled state and the starting-enabled state of the vehicle based on the relay control command; a step of detecting a state of the external relay; and a relay monitoring step of monitoring the detected state of the external relay and controlling the external relay. In the relay monitoring step, when the detected relay state is a predetermined state, the external relay is set to a state different from the predetermined state.

A twenty-second aspect of the present invention provides a vehicle remote control system including: a server including a remote control command unit configured to generate a relay control command to make a switch between a starting-disabled state and a starting-enabled state of a vehicle; an external relay configured to make a switch between the starting-disabled state and the starting-enabled state of the vehicle; and a vehicle-mounted device. The vehicle-mounted device includes at least one of an IGN input detecting unit connected to a running state identification line of the vehicle, a power supply input detecting unit connected to an external battery of the vehicle, and a position information detecting unit connected to a GPS of the vehicle. The vehicle-mounted device further includes relay input/output means connected to the external relay, communication means for performing communication with the server, and relay control means for controlling the external relay through the relay input/output means based on the relay control command received from the server. Connection between the running state identification line of the vehicle and the IGN input detecting unit, connection between the external battery of the vehicle and the power supply input detecting unit, connection between the GPS of the vehicle and the position information detecting unit, and connection between the external relay and the relay input/output means are formed by individual wires. The server acquires information on at least one of the IGN input detecting unit, the power supply input detecting unit, and the position information detecting unit and, when it is determined that the vehicle is in a safe state, transmits the relay control command to the vehicle-mounted device.

A twenty-third aspect of the present invention provides a vehicle remote control system including: a server including a remote control command unit configured to generate a relay control command to make a switch between a starting-disabled state and a starting-enabled state of a vehicle; an external relay configured to make a switch between the starting-disabled state and the starting-enabled state of the vehicle; and a vehicle-mounted device. The vehicle-mounted device includes at least one of an IGN input detecting unit connected to a running state identification line of the vehicle, a power supply input detecting unit connected to an external battery of the vehicle, and a position information detecting unit connected to a GPS of the vehicle. The vehicle-mounted device further includes relay input/output means connected to the external relay, communication means for performing communication with the server, and relay control means for controlling the external relay through the relay input/output means based on the relay control command received from the server. Connection between the running state identification line of the vehicle and the IGN input detecting unit, connection between the external battery of the vehicle and the power supply input detecting unit, connection between the GPS of the vehicle and the position information detecting unit, and connection between the external relay and the relay input/output means are formed by individual wires. The vehicle-mounted device controls the external relay to a starting-enabled state when communication with the server by the communication means fails to be established.

According to a twenty-fourth aspect of the present invention, in the vehicle remote control system of the twenty-second or twenty-third aspect, the external relay is inserted to any one of an engine starting control line, a signal line for an ID code on a transponder side received by the vehicle from a transponder in an immobilizer, a signal line for an ID code on the vehicle side in an immobilizer, and wiring of a push button for starting.

According to a twenty-fifth aspect of the present invention, in the vehicle remote control system of the twenty-second or twenty-third aspect, the server communicates by radio with the vehicle-mounted devices of a plurality of vehicles and transmits a relay control command to the vehicle-mounted devices of the vehicles.

A twenty-sixth aspect of the present invention provides a vehicle remote control system including: a server configured to generate a relay control command to make a switch between a starting-disabled state and a starting-enabled state of a vehicle; an external relay configured to switch the vehicle between the starting-disabled state and the starting-enabled state; and a vehicle-mounted device configured to perform communication with the server and control the external relay through a relay input/output unit, based on the relay control command received from the server. The vehicle-mounted device further includes means for detecting an abnormality that is removal of the vehicle-mounted device or cutting-off or removal of wiring connected to the vehicle-mounted device. Connection of the external relay is selectively switched to normally open or normally closed between the vehicle and the relay input/output unit, whereby the vehicle is set to the starting-disabled state or the starting-enabled state when the abnormality is detected.

According to a twenty-seventh aspect of the present invention, in the vehicle remote control system of the twenty-sixth aspect, when the abnormality is detected, the vehicle-mounted device notifies the server of the abnormality.

According to a twenty-eighth aspect of the present invention, in the vehicle remote control system of the twenty-sixth aspect, the vehicle-mounted device further includes a power supply input detecting unit connected to an external power supply, and the abnormality is detected based on that the power supply input detecting unit has detected stop of power supply from the external power supply.

According to a twenty-ninth aspect of the present invention, in the vehicle remote control system of the twenty-sixth aspect, the abnormality is detected based on cutting-off or removal of wiring between the external relay and the relay input/output unit.

According to a thirtieth aspect of the present invention, in the vehicle remote control system of the twenty-sixth aspect, the external relay is configured to change between normally open and normally closed by changing connections.

According to a thirty-first aspect of the present invention, in the vehicle remote control system of the twenty-sixth aspect, the external relay is configured to either set the vehicle to the starting-disabled state when the abnormality is detected or set the vehicle to the starting-enabled state when the abnormality is detected, by changing connections.

According to a thirty-second aspect of the present invention, in the vehicle remote control system of the twenty-sixth aspect, the relay is connected so as to be normally open when the vehicle is set to the starting-disabled state upon detection of the abnormality, and the relay is connected so as to be normally closed when the vehicle is set to the starting-enabled state upon detection of the abnormality.

According to a thirty-third aspect of the present invention, in the vehicle remote control system of the twenty-sixth aspect, the external relay is inserted to any one of an engine starting control line, a signal line for an ID code on a transponder side received by the vehicle from a transponder in an immobilizer, a signal line for an ID code on the vehicle side in an immobilizer, and wiring of a push button for starting.

According to a thirty-fourth aspect of the present invention, in the vehicle remote control system of the twenty-sixth aspect, the vehicle-mounted device controls the external relay to a starting-enabled state when the communication fails to be established.

Advantageous Effects of Invention

The vehicle-mounted device according to the first aspect can prevent the vehicle from entering the starting-disabled state in a dangerous place or a place where the vehicle obstructs people, considering safety of the vehicle, when the vehicle is changed to the starting-disabled state under an instruction from the server in a case where the charge is not paid within a predetermined time limit or a theft is detected.

The vehicle-mounted device according to the second aspect can prevent the vehicle from improperly switching to the starting-disabled state even when the power of the vehicle is turned on again immediately after the power of the vehicle is turned off.

The vehicle-mounted device according to the third aspect can reliably prevent the problem of switching to the starting-disabled state when the power of the vehicle is on, because the vehicle power on/off state reevaluation period is provided and a delay time until the vehicle-mounted device recognizes the turning-on of the power after the power is turned on is taken into consideration.

The vehicle-mounted device according to the fourth aspect can prevent the vehicle from being left in the starting-disabled state when the radio wave condition is poor.

In the vehicle according to the fifth aspect, a vehicle achieving the same effect as in the vehicle-mounted device of the first aspect can be provided.

In the vehicle remote control system according to the sixth aspect, a vehicle remote control system achieving the same effect as in the vehicle-mounted device of the first aspect can be provided.

In the remote control system according to the seventh aspect, the vehicle can be switched between the starting-disabled state and the starting-enabled state under the control of the external relay.

In the vehicle remote control system according to the eighth aspect, the server can grasp the vehicle operation status and then transmit a relay control command if the vehicle is in a safe condition.

In the method of controlling a vehicle-mounted device according to the ninth aspect, a control method achieving the same effect as in the vehicle-mounted device of the first aspect can be provided.

In the program for a vehicle-mounted device according to the tenth aspect, a program achieving the same effect as in the vehicle-mounted device of the first aspect can be provided.

The vehicle-mounted device according to the eleventh aspect can prevent unintentional disablement of starting due to a malfunction of firmware and thus prevent hinderance to legitimate use.

The vehicle-mounted device according to the twelfth aspect can prevent unintentional disablement of starting when the external relay is supposed to be in the starting-enabled state, and thus prevent hinderance to legitimate use.

The vehicle-mounted device according to the thirteenth aspect can reliably determine that the state is supposed to be the starting-enabled state based on a relay control command.

The vehicle-mounted device according to the fourteenth aspect can reliably determine the relay state of the external relay using the vehicle type-basis starting-enable relay value.

The vehicle-mounted device according to the fifteenth aspect can prevent the vehicle from being left in the starting-disabled state when the radio wave condition is poor.

In the vehicle according to the sixteenth aspect, a vehicle achieving the same effect as in the vehicle-mounted device of the eleventh aspect can be provided.

In the vehicle remote control system according to the seventeenth aspect, a vehicle remote control system achieving the same effect as in the vehicle-mounted device of the eleventh aspect can be provided.

In the vehicle remote control system according to the eighteenth aspect, the vehicle can be switched between the starting-disabled state and the starting-enabled state under the control of the external relay.

In the vehicle remote control system of the nineteenth aspect, the server can grasp the vehicle operation status and then transmit a relay control command if the vehicle is in a safety condition.

In the method of controlling a vehicle-mounted device according to the twentieth aspect, a control method achieving the same effect as in the vehicle-mounted device of the eleventh aspect can be provided.

In the program for a vehicle-mounted device according to the twenty-first aspect, a program achieving the same effect as in the vehicle-mounted device of the eleventh aspect can be provided.

The vehicle remote control system according to the twenty-second aspect can eliminate the vulnerability to security risk in communication of the vehicle-mounted device, because a vehicle LAN such as CAN is not used in communication of the vehicle-mounted device, and the server can grasp the vehicle operation status and then transmit a relay control command if the vehicle is in a safe condition.

The vehicle remote control system according to the twenty-third aspect can eliminate the vulnerability to security risk in communication of the vehicle-mounted device, because a vehicle LAN such as CAN is not used in communication of the vehicle-mounted device, and can prevent the vehicle from being left in the starting-disabled state when the radio wave condition is poor.

In the vehicle remote control system according to the twenty-fourth aspect, the vehicle can be switched between the starting-disabled state and the starting-enabled state under the control of the external relay.

In the vehicle remote control system according to the twenty-fifth aspect, the server can grasp the vehicle operation status and then transmit a relay control command if the vehicle is in a safe condition.

In the vehicle remote control system according to the twenty-sixth aspect, setting the vehicle to the starting-disabled state or setting the vehicle to the starting-enabled state can be selected according to the manager's need when the vehicle-mounted device is removed on purpose or wiring is removed or cut off.

In the vehicle remote control system according to the twenty-seventh aspect, an abnormality of the vehicle-mounted device can be grasped at the server.

In the vehicle remote control system according to the twenty-eighth aspect, an abnormality of the vehicle-mounted device can be detected using the power supply input detecting unit.

In the vehicle remote control system according to the twenty-ninth aspect, an abnormality of the vehicle-mounted device can be detected using the relay input/output unit.

In the vehicle remote control system according to the thirtieth aspect, the external relay can be changed between normally open and normally closed by changing connections of the external relay before shipment of the vehicle.

In the vehicle remote control system according to the thirty-first aspect, whether to set the vehicle to the starting-disabled state when an abnormality is detected or to set the vehicle to the starting-enabled state when the abnormality is detected can be changed by changing connections of the external relay before shipment of the vehicle.

In the vehicle remote control system according to the thirty-second aspect, whether to set the vehicle to the starting-enabled state when an abnormality is detected or to set the vehicle to the starting-enabled state when the abnormality is detected can be changed by changing connections of the external relay to normally open and normally closed before shipment of the vehicle.

In the vehicle remote control system according to the thirty-third aspect, the vehicle can be switched between the starting-disabled state and the starting-enabled state under the control of the external relay.

The vehicle remote control system according to the thirty-fourth aspect can prevent the vehicle from being left in the starting-disabled state when the radio wave condition is poor.

BRIEF DESCRIPTION OF DRAWINGS

FIGS. 3A and 3B are illustrations of relay values, in which FIG. 3A illustrates a case of a vehicle type having one starting control line and FIG. 3B illustrates a case of a vehicle having two starting control lines.

FIG. 4 is an illustration of wiring of a relay.

FIG. 9 is an illustration of the starting-disabled state for each vehicle type.

DESCRIPTION OF EMBODIMENTS

A vehicle-mounted device according to embodiments of the present invention, a vehicle including the vehicle-mounted device, a vehicle remote control system including the vehicle-mounted device, a method of controlling the vehicle-mounted device, and a program for the vehicle-mounted device will be described below with reference to the drawings. It is noted that the embodiments described below merely illustrate a vehicle remote control system for embodying the technical concept of the present invention, and the present invention is not intended to be limited to these embodiments and is applicable to other embodiments falling within the claims.

First Embodiment

A vehicle remote control system according to a first embodiment is described with reference to FIG. 1 to FIG. 8. In the first embodiment, the vehicle remote control system is adapted to an internal combustion engine vehicle that runs using an internal combustion engine such as a gasoline engine, and is configured to make a switch to a starting-disabled state by cutting off an engine starting control line (ST line) of the internal combustion engine using an external relay.

Figure 1:
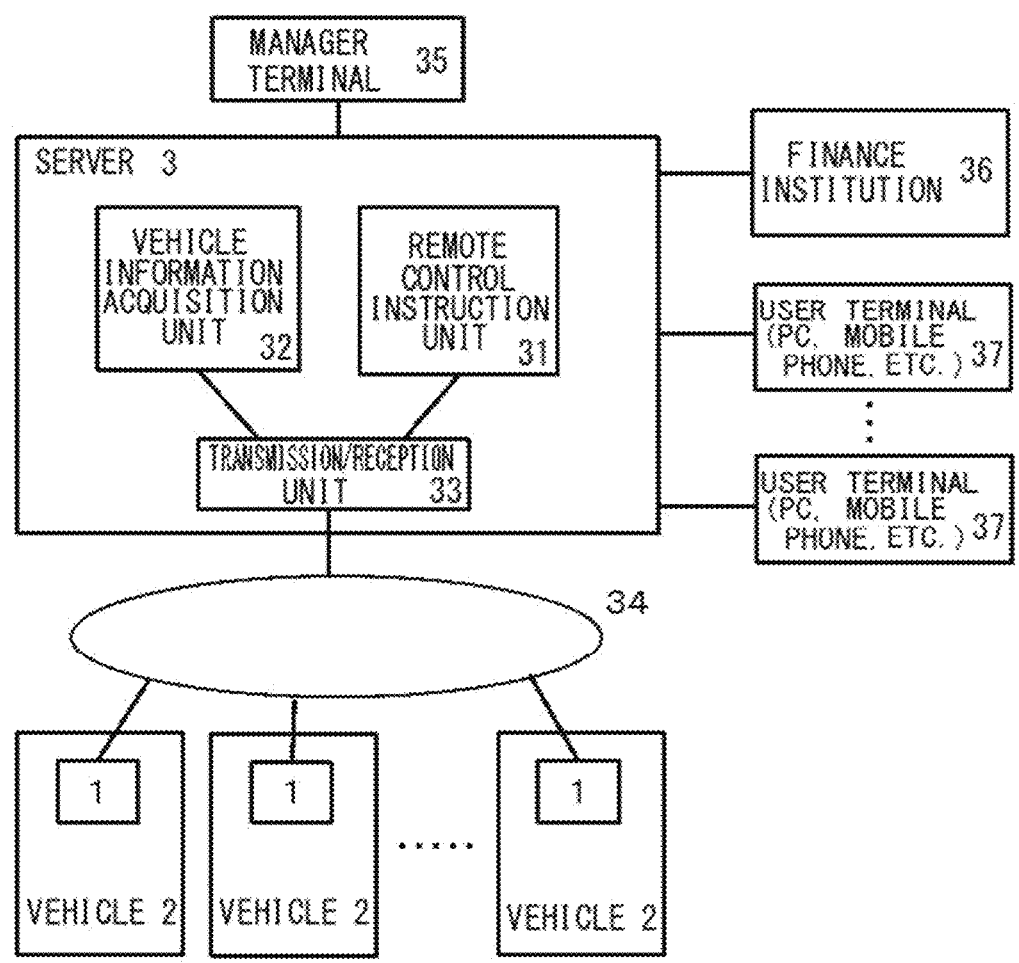
FIG. 1 is an overall diagram of a remote control system.

FIG. 1 is an overall view of the vehicle remote control system of the present invention. This system implements a service that provides a user with a vehicle and, when the user does not pay the charge (for example, monthly fee) within a predetermined time limit, remotely stops the vehicle (starting-disabled state) and specifies the position of the vehicle to retrieve the vehicle. FIG. 1 illustrates vehicles 2 provided to users, vehicle-mounted devices 1 installed on the vehicles 2, and a server 3 communicating with the vehicle-mounted devices 1 for managing the vehicles.

One vehicle-mounted device 1 is installed on one vehicle. The vehicle-mounted device 1 may be installed in any place in the vehicle. When the vehicle-mounted device 1 is an add-on part, it can be installed at a place easy to access for installation such as under the passenger's seat. In terms of the antitheft purpose, it can be disposed at a place difficult to access for removal of the vehicle-mounted device 1, for example, in the lower portion of the engine compartment or the inside of the instrument panel. Alternatively, the vehicle-mounted device 1 may be built in beforehand during manufacturing of the vehicle 2. The vehicle-mounted device 1 transmits the vehicle information on the vehicle 2 acquired by vehicle information detecting means to the server through a wireless communication network 34 and receives a relay control signal from the server 3 through the wireless communication network 34 to control an external relay 20 (see FIG. 2) for the vehicle 2 as described later. The external relay 20 can be controlled to make a switch between the starting-disabled state and the starting-enabled state of the vehicle. In the case of an internal combustion engine car, in the starting-disabled state, the engine is unable to be started (not meaning that the engine is turned off, but meaning that the restarting of the engine is prohibited), whereas in the starting-enabled state, the engine is able to be started. Here, any wireless communication network can be employed, and examples include 2G, 3G, 4G, 5G, Wi-Fi (registered trademark), WiMAX (registered trademark), wireless LAN, beacons, Bluetooth (registered trademark), and ZigBee (registered trademark).

The server 3 includes a remote control instruction unit 31 for generating a relay control command for the vehicle-mounted device 1, a vehicle information acquisition unit 32 for acquiring vehicle information from the vehicle-mounted device 1, and a transmission/reception unit 33 for transmitting/receiving data to/from the vehicle-mounted device. The server 3 is connected to a manager terminal 35, a finance institution 36, and user terminals. Examples of the user terminals include PCs, mobile phones, and smartphones. The server 3 can be connected to the external finance institution 36 to determine whether each user has paid a predetermined charge within a predetermined time limit. Alternatively, the server 3 may have the function as the finance institution 36. The transmission/reception unit 33 communicates with a plurality of vehicle-mounted devices 1 by radio through the wireless communication network 34. The manager terminal 35 includes a display for presenting information to the manager and information input means for inputting information from the manager. Examples of the manager terminal 35 include PC, tablet terminal, and portable terminal. A touch panel display, a keyboard, a mouse, and the like can be used as the information input means. When a touch panel display is used, a separate keyboard can be omitted.

The server 3 can grasp the vehicle operation status from the vehicle information periodically received from the vehicle-mounted device 1. Preferably, the vehicle information includes on/off information on the power of the vehicle, power supply input detection information, the state of the external relay, and GPS position information on the vehicle. The server 3 grasps the vehicle operation status to determine, as necessary, whether the vehicle is parked at a predetermined parking area, whether the vehicle is parked at a place other than a predetermined parking area, whether the user is moving using the vehicle, or whether there is a possibility that the vehicle has been stolen. The determination as to whether each user has paid a predetermined charge within a predetermined time limit, the determination as to whether to change a corresponding vehicle to a starting-disabled state, the determination as to the operation state of the vehicle as described later, the inquiry to the user and reporting to the police in the event of a theft or in the event of an abnormality may be performed automatically by the server 3, or all or some of them may be performed manually by the manager. When all or some of these determinations are made manually by the manager, the configuration of the server 3 can be simplified because there is no need for making a determination of complicated conditions in the server 3.

A method of automatically determining the vehicle operation status by the server 3 will now be described in detail. When the power of the vehicle is in the off state for a predetermined time or longer at a place equivalent to a parking area registered in advance, it is determined that the vehicle is parked at a predetermined parking area. When the power of the vehicle is in the off state for a predetermined time or longer at a place other than the parking area registered in advance, it is determined that the vehicle is parked at a place other than the predetermined parking area. When the vehicle is at a place other than the parking area registered in advance and the power of the vehicle is not in the off state for a predetermined time or longer, it is determined that the user is moving using the vehicle.

When the vehicle is out of the range registered in advance by the user for a predetermined period or longer, it is determined that there is a possibility that the vehicle has been stolen. If it is determined that there is a possibility that the vehicle has been stolen, the contact registered in advance by the user is notified of the vehicle operation status, and an inquiry is made as to whether a theft has occurred. If there is no reply from the user within a predetermined time limit or if there is a reply indicating theft from the user, a notification of theft is given to the manager, and a relay control command corresponding to the starting-disabled state is transmitted to the vehicle-mounted device 1. If the manager receives a notification of theft from the server 3, the manager makes contact with the user to check on the occurrence of theft and then reports the vehicle theft to the police if necessary.

The vehicle-mounted device 1 further includes means for detecting an abnormality such as removal of the vehicle-mounted device 1 from the vehicle 2 or cutting-off or removal of wiring connected to the vehicle-mounted device 1. When such an abnormality is detected, the vehicle-mounted device 1 notifies the server 3 of the occurrence of abnormality. When this notification is given, the server 3 promptly gives a notification to the manager. When receiving the notification of abnormality from the server 3, the manager makes contact with the user to check on the occurrence of theft and then reports the vehicle theft to the police if necessary.

Examples of possible cases where the vehicle-mounted device 1 has been removed from the vehicle 2 include (1) theft by a thief, (2) misuse of the vehicle by the user, and (3) use of the vehicle in an unavoidable and urgent case by the user who has not paid. In the cases of theft and misuse as in (1) and (2), it is desirable to set the vehicle to the starting-disabled state. On the other hand, in the urgent case as in (3), for example, when an emergency patient is to be transported, it is desirable to set the vehicle to the starting-enabled state. As will be described later, the external relay 20 can switch its connection to select a mode of setting the starting-disabled state or a mode of setting the starting-enabled state when the wiring is cut off or removed. Accordingly, the external relay 20 is preset to enter the starting-disabled state if the vehicle-mounted device 1 detects the abnormality or if the manager assumes theft or misuse as in the cases (1) and (2) when the wiring of the external relay 20 is cut off or removed, whereas the external relay 20 is preset to enter the starting-enabled state if the manager assumes an urgent case as in the case (3).

The control of the external relay 20 depending on the user's ability to pay will now be described. At the shipment of a vehicle, the external relay 20 of the vehicle is set to the starting-enabled state such that the starting of the vehicle is possible. At the server 3, it is determined whether the user of each vehicle has paid the charge within a predetermined time limit, based on data from finance institutions. If the charge has not been paid within a predetermined time limit, the vehicle operation status is checked, and if a predetermined condition is met, the server 3 transmits a relay control command corresponding to the starting-disabled state from the remote control instruction unit 31 to the corresponding vehicle-mounted device 1 in order to set the corresponding vehicle 2 to the starting-disabled state. The vehicle-mounted device 1, which receives the relay control command corresponding to the starting-disabled state, switches the external relay 20 to the starting-disabled state, so that the corresponding vehicle 2 enters the starting-disabled state, that is, in the case of an internal combustion engine, a state in which the starting of the engine is impossible. On the other hand, in a state in which there is no relay control command corresponding to the starting-disabled state from the server 3 to the vehicle-mounted device 1, the external relay 20 is usually set in the starting-enabled state. Therefore, when the charge has been paid within a predetermined time limit, there is no relay control command corresponding to the starting-disabled state from the server 3 to the vehicle-mounted device 1. Thus, the external relay 20 is set in the starting-enabled state, and the corresponding vehicle 2 is in the starting-enabled state, that is, in the case of a vehicle with an internal combustion engine, a state in which the starting of the engine is possible. If the user has paid the charge in accordance with a predetermined condition specified by the manager after the vehicle once enters the starting-disabled state in the absence of payment as described above, the server 3 transmits a relay control command corresponding to the starting-enabled state from the remote control instruction unit 31 to the corresponding vehicle-mounted device 1 in order to set the corresponding vehicle to the starting-enabled state again. When the vehicle-mounted device 1 receives the relay control command corresponding to the starting-enabled state, the external relay 20 is switched to the starting-enabled state, and the corresponding vehicle enters the starting-enabled state again.

When the charge is a monthly fee, it is determined whether a predetermined amount of money has been paid, for example, no later than 25th of the previous month. If a predetermined amount has not been paid, a message is transmitted to the user to indicate that the user is delinquent and if a predetermined charge fails to be paid within one week, the vehicle will be set to the starting-disabled state. If a predetermined charge is not paid within one week from transmission of this message, the server 3 checks the vehicle operation status and then transmits a relay control command corresponding to the starting-disabled state from the remote control instruction unit 31 to the corresponding vehicle-mounted device 1 under the condition that a predetermined condition is satisfied. If the user does not pay a predetermined fee after the elapse of a predetermined period, for example, one month since the vehicle was set to the starting disabled state, an arrangement to retrieve the vehicle is made. On the other hand, if the deposit of a predetermined amount of money by the user is confirmed within a predetermined time limit after the relay control command corresponding to the starting-disabled state is transmitted to the vehicle-mounted device 1, the server 3 transmits a relay control command corresponding to the starting-enabled state from the remote control instruction unit 31 to the corresponding vehicle-mounted device 1 and sets the vehicle to the starting-enabled state again. In a state in which there is no relay control command corresponding to the starting-disabled from the server 3 to the vehicle-mounted device 1, the external relay 20 is usually set to the starting-enabled state, and thus the corresponding vehicle is set in the starting-enabled state. Accordingly, the user can use the vehicle kept in the starting-enabled state as long as the user has paid a predetermined fee no later than 25th every month.

In setting the vehicle 2 to the starting-disabled state, it is necessary to consider the operation state of the vehicle. That is, switching to the starting-disabled state while the user is moving on the vehicle may produce a severe situation for the user and, in addition, may cause a hinderance to the other traffic. Moreover, as will be described later, the switching to the starting-disabled state of the external relay in the power-on state of the vehicle may cause a trouble depending on the kind of vehicles and some conditions to be avoided may exist in view of safety. Here, a description will be made, with examples, of a case where the server 3 automatically determines the operation state of the vehicle and switches the vehicle to the starting-disabled state and a case where the switching to the starting-disabled state is deferred. For example, the server 3 checks the vehicle operation status from the GPS position information and the vehicle power on/off information acquired from the vehicle, determines that the vehicle is parked at a predetermined parking area under the condition that the power of the vehicle is off and the vehicle is in a predetermined parking area, and transmits a relay control command to set the external relay 20 to the starting-disabled state to the vehicle-mounted device 1 of the corresponding vehicle 2, thereby switching the vehicle 2 to the starting-disabled state. In this case, because the vehicle 2 is parked at a predetermined parking area, there is no possibility that the other traffic is hindered. For example, the server 3 checks the vehicle operation status and, if the power of the vehicle is on and the vehicle is in a place that is not a predetermined parking area, determines that the user is using the vehicle, and defers transmitting a relay control command for switching the external relay 20 to the starting-disabled state to the vehicle-mounted device 1 of the corresponding vehicle. In this way, in the present invention, the vehicle-mounted device 1 is configured to determine the safety as will be described later, and thus the determination in the server 3 can be relatively simplified.

In the example described here, the determination as to whether each user has paid a predetermined fee within a predetermined time limit, the transmission of a message to the user, the determination as to the operation state of the vehicle, the determination as to transmission of a relay control command corresponding to the starting-enabled state and the starting-disabled state, and the inquiry to the user and reporting to the police in the event of theft or abnormality are all performed automatically by the server. However, some or all of the determinations may be performed manually by the manager from the manager terminal 35.

Figure 2:
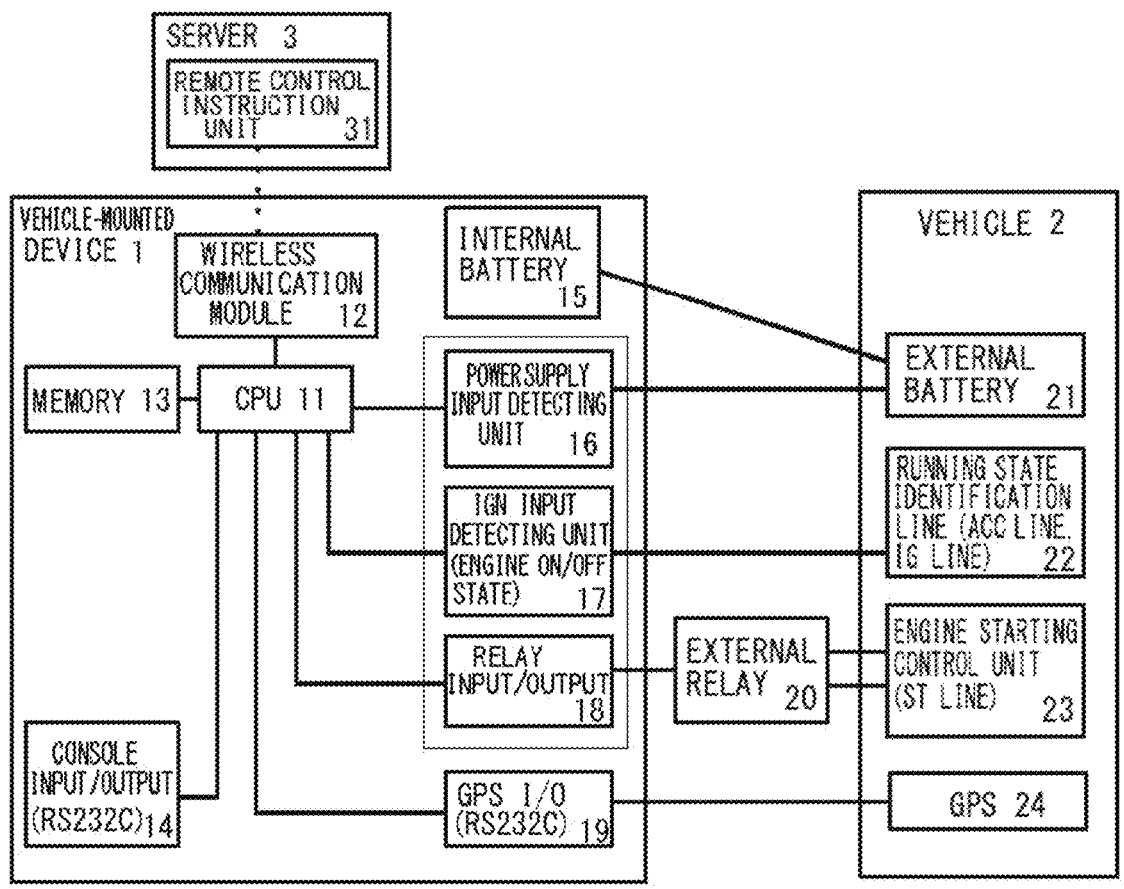
FIG. 2 is an illustration of a vehicle-mounted device and wiring thereof.

The configuration of the vehicle-mounted device 1 and the connection to the vehicle 2 is now described with reference to FIG. 2. FIG. 2 illustrates an example of connection to an internal combustion engine vehicle. The same parts as in FIG. 1 are denoted with the same reference signs and will not be further described. FIG. 2 illustrates a CPU 11 for arithmetic operations, a wireless communication module 12 for communicating by radio with the transmission/reception unit of the server 3 through a wireless communication network, a memory 13 configured, for example, as a non-volatile memory for storing a state of the relay, a console 14 for making a variety of settings for the vehicle-mounted device, an internal battery 15 which is a battery inside the vehicle-mounted device to be charged with power from an external battery 21 of the vehicle 2, a power supply input detecting unit 16 for detecting power supply input from the external battery 21 of the vehicle 2, an IGN input detecting unit 17 connected to a running state identification line (ACC line, IGN line) 22 of the vehicle 2 for detecting the on/off state of the engine, a relay input/output unit 18 connected to the external relay 20, and a GPS input/output unit 19 connected to a GPS 24 of the vehicle 2 for detecting the position information on the vehicle. Although not illustrated, the vehicle-mounted device 1 may include an acceleration sensor. Furthermore, the vehicle-mounted device 1 may be configured to detect information such as vehicle speed pulse and a fuel sensor. Here, the external battery 21 refers to the term distinguished from the internal battery 15 inside the vehicle-mounted device 1 and means an on-vehicle battery. The external relay 20 is connected to the engine starting control line (ST line) of the vehicle 2. Although the external relay 20 is illustrated between the vehicle 2 and the vehicle-mounted device 1 in FIG. 2, the external relay 20 is actually provided in the inside of the engine compartment of the vehicle 2 and the external relay is disposed at a place hidden from the outside. The external relay 20 is thus a structure unable to be removed on purpose by a theft or a user. The relay input/output unit 18 detects whether the external relay 20 is in the starting-disabled state or in the starting-enabled state and performs control such that the external relay 20 is switched to the starting-disabled state or the starting-enabled state based on a relay control command.

The power supply input detecting unit 16 is connected with the external battery 21, the IGN input detecting unit 17 is connected with the running state identification line 22, the relay input/output unit 18 is connected with the external relay 20, and the GPS input/output unit 19 is connected with the GPS 24, each directly with individual wires, not through a vehicle LAN such as CAN. Because a vehicle LAN such as CAN is thus not used, there is no problem of the vulnerability to security risk as is the case in a vehicle LAN such as CAN.

The vehicle-mounted device 1 is driven by electric power of the internal battery 15. The internal battery is always charged with electric power of the external battery 21 of the vehicle 2 and can continuously drive the vehicle-mounted device for a predetermined time even in the event of abnormality such as when the vehicle-mounted device 1 is removed or when the charge line is cut off or removed. For this reason, the server 3 can be notified of the occurrence of abnormality together with the present location information. The latest present location information and other information are stored in the memory 13.

The CPU 11 is connected to the wireless communication module 12, the memory 13, the console 14, the internal battery 15, the power supply input detecting unit 16, the IGN input detecting unit 17, the relay input/output unit 18, the GPS input/output unit 19, and a not-illustrated acceleration sensor. The power supply input detecting unit 16, the IGN input detecting unit 17, the GPS input/output unit 19, and the acceleration sensor are provided as vehicle information detecting means. The relay input/output unit 18 detects a state of the external relay 20 and controls the external relay

20 to one of the starting-disabled state and the starting-enabled state. The state of the external relay 20 is also usable as the vehicle information.

The CPU 11 controls the external relay 20 and acquires vehicle information under instructions of a program stored in the memory 13. The operation of the vehicle-mounted device 1 will be described below.

<Acquisition of Vehicle Information>

The vehicle-mounted device 1 acquires vehicle information and transmits the vehicle information to the server 3 at predetermined intervals, for example, every 30 seconds, or at a time of occurrence of a certain event such as turning-on of the vehicle power, or both. The vehicle information here includes at least one of information on power supply input from the external battery 21 that is detected by the power supply input detecting unit 16, information on the running state identification line (ACC line, IGN line) detected by the IGN input detecting unit 17, for example, information indicating on/off of the engine, information on the external relay 20 that is detected by the relay input/output unit 18, the position information from the GPS that is detected by the GPS input/output unit 19, information on acceleration that is detected from a not-illustrated acceleration sensor, information on vehicle speed pulse, information on the fuel sensor, and information on the time when the vehicle information is acquired. The speed may be calculated from the GPS position information. The server 3 grasps a vehicle operation status based on such vehicle information.

<Control of External Relay>

When the vehicle-mounted device 1 receives a relay control command from the server 3, the control value thereof is stored into the memory 13, and the external relay 20 is controlled to attain a state corresponding to the value. "Vehicle information-associated control means" includes the CPU 11, the memory 13, the IGN input detecting unit 17, and the relay input/output unit 18 and, when the external relay 20 is switched, determines whether to employ a relay control command and not to employ (ignore a relay control command), considering the on/off switching timing of power of the vehicle, as will be described later. In the case of an internal combustion engine vehicle, the on/off of the power is detected from, for example, information on the running state identification line (ACC line, IGN line) that is detected by the IGN input detecting unit 17, for example, information indicating the on/off state of the engine.

A relay control value (the control value for the ST line relay) in a case where the engine starting control line (ST line) in an internal combustion engine vehicle is cut by the external relay 20 (the case in FIG. 2) is now described with reference to FIG. 3. FIG. 3A illustrates the case of a vehicle type having one engine starting control line, and FIG. 3B illustrates the case of a vehicle type having two engine starting control lines. First, the case of the vehicle type having one engine starting control line in FIG. 3A will be described. The relay value is "0" when the relay A is open, and it is "1" when closed. There are two external relay control values: "00" and "01". When the external relay control value is "00", the status is the starting-enabled state (normal) and the vehicle state is starting-enabled. On the other hand, when the external relay control value is "01", the status is the starting-disabled state and the vehicle state is starting-disabled.

The vehicle type having two engine starting control lines in FIG. 3B will now be described. When each of the relay A and the relay B is open, the relay value is "0", and when closed, the relay value is "1". There are four external relay control values: "00", "01", "10", and "11". When the external relay control value is "00", the status is the starting-enabled state (normal) and the vehicle state is starting-enabled. When the external relay control value is "01", the status is an unintended value and the vehicle state is starting-enabled. When the external relay control value is "10", the status is an unintended value and the vehicle state is starting-enabled. When the external relay control value is "11", the status is the starting-disabled state and the vehicle state is starting-disabled.

A "relay monitoring unit" includes the CPU 11, the memory 13, and the relay input/output unit 18 and monitors the relay state when the external relay control value is supposed to be the starting-enabled state due to a malfunction of firmware, as will be described later. As a result of the monitoring, when the relay state is a state other than the starting-enabled state, the relay state is set to the starting-enabled state, that is, the external relay control value is set to "00", and the external relay 20 is set to the starting-enabled state.

The wiring of the external relay 20 is now described with reference to FIG. 4. Normally open and normally closed can be selected by changing the connection state of the external relay 20. FIG. 4 illustrates an electromagnetic coil 41, a switch 42, terminals 43 and 44 on the relay input/output unit 18 side, one terminal 45 on the engine starting control line (ST line) side, a normally closed terminal 46, and a normally open terminal 47. Because the switch 42 is biased toward the normally closed terminal 46 by a spring, the switch 42 is in contact with the normally closed terminal 46 side when the coil 41 is not energized. When the coil 41 is energized, the switch 42 is attracted to the electromagnet and comes into contact with the normally open terminal 47. Therefore, when the external relay 20 is intended to be used as the normally closed type, the other terminal of the ST line is connected to the normally closed terminal 46. Conversely, when the external relay 20 is intended to be used as the normally open type, the other terminal of the ST line is connected to the normally open terminal 47.

The difference between when the external relay 20 is intended to be used as the normally closed type and when the external relay 20 is intended to be used as the normally open type is now described with reference to FIG. 2. At least one of the power supply input detecting unit 16, the IGN input detecting unit 17, the relay input/output unit 18, and the GPS input/output unit 19 is provided with means for detecting cutting-off or removal of wiring (not illustrated). As the means for cutting-off or removal of the wiring, known methods such as using a wiring voltage change associated with cutting-off or removal of wiring, for example, as disclosed in Patent Literature 2 can be used. When the power supply input detecting unit 16 does not detect power supply input from the external battery 21, it can be determined that the wiring between the power supply input detecting unit 16 and the external battery 21 has been cut off or removed. The removal of the vehicle-mounted device can also be detected based on the cutting-off or removal of the wiring. It is determined in advance which control to perform, namely, to set the external relay 20 to the starting-disabled state (open) or to the starting-enabled state (closed) when cutting-off or removal of the wiring is detected, as will be described later.

When cutting-off or removal of the wiring is detected, the external relay 20 is controlled as previously mentioned and the server 3 is notified of the abnormality through the wireless communication module 12. When the server 3 receives the notification of the abnormality, the server 3 promptly notifies the manager. When receiving the notification of the abnormality from the server 3, the manager makes contact with the user to check on the occurrence of a theft and then reports theft of the vehicle to the police, if necessary. On the other hand, the vehicle-mounted device 1 gives a notification of the abnormality and also produces an alarm sound using an alarm (not illustrated) mounted on the vehicle-mounted device 1. Instead of an alarm mounted on the vehicle-mounted device 1, the horn, headlamp, blinker, hazard lamp, etc. of the vehicle may be used to produce an alarm. In order to do so, wiring may be connected such that an output signal for alarm output of the vehicle-mounted device 1 is input to the input terminals of the control circuits of the horn, headlamp, blinker, hazard lamp, etc.

Here, detection of cutting-off or removal of the wiring has been described as an example of the notification of abnormality. Alternatively, the vehicle-mounted device 1 may further include failure detecting means, so that when the failure detecting means detects a failure of the vehicle-mounted device 1, the server is notified of the failure of the vehicle-mounted device 1 through the wireless communication module 12. When the server 3 receives the notification of a failure of the vehicle-mounted device 1, the server reports the occurrence of a failure to the manager, and the manager receiving the report makes contact with the user of the corresponding vehicle and makes an arrangement to repair or exchange the vehicle-mounted device 1.

When cutting-off or removal of the wiring occurs between the relay input/output unit 18 and the external relay 20, current supply to the coil 41 of the external relay 20 is stopped, so that in the case of the normally closed type, the external relay 20 is closed and the ST line is connected, whereas in the case of the normally open type, the external relay 20 is open and the ST line is interrupted (cut).

As previously mentioned, the possible cases when the manager removes the vehicle-mounted device 1 from the vehicle 2 are (1) theft by a thief, (2) misuse of the vehicle by the user, and (3) use of the vehicle in an unavoidable and urgent case. In the cases of theft and misuse as in (1) and (2), it is desirable to set the vehicle to the starting-disabled state. Therefore, the normally open type is employed as the external relay 20, and it is determined in advance to control the external relay 20 to the starting-disabled state (open) also when cutting-off or removal of the wiring is detected. On the other hand, in the urgent case as in (3), for example, when an emergency patient is to be transported, it is desirable to set the vehicle to the starting-enabled state. Therefore, the normally closed type is employed as the external relay 20, and it is determined in advance to control the external relay 20 to the starting-enabled state (closed) also when cutting-off or removal of the wiring is detected.

The vehicle-mounted device 1 can fail-safe independently, even in a poor radio wave condition and without a relay control command from the server 3. For example, this configuration avoids a situation in which the vehicle enters the starting-disabled state in a place with a poor radio wave condition and becomes unable to receive a relay control command corresponding to the starting-enable information. The vehicle-mounted device repeatedly retries communication to establish communication when the radio wave condition is poor. When communication fails to be established a predetermined number of times, for example, 20 or more retries in succession, it is determined that the communication has failed, and when the state of the external relay 20 is the starting-disabled state, switching to the starting-enabled state is performed. This configuration can avoid a situation in which the vehicle is left in the starting-disabled state because a relay control signal to change to the starting-enabled state is unable to be transmitted from the server 3 in a poor radio wave condition. Whether to employ the process of switching the vehicle to the starting-enabled state at the time of communication failure can be switched at the time of shipment of the vehicle.

<Power Saving Mode>

When the engine of an internal combustion engine vehicle is off, the vehicle-mounted device shifts to a power saving mode to stop the functions except the minimum required functions such as power supply management in order to prevent consumption of power of the external battery 21, after the elapse of a predetermined time, for example, 10 minutes since turning off of the engine. In the power saving mode, the power supply input detecting unit 16, the IGN input detecting unit 17, the relay input/output unit 18, and a timer circuit (not illustrated) are always active whereas the other circuits are stopped. During the power saving mode, the vehicle-mounted device 1 does not communicate with the server 3. During the power saving mode, if the power supply input detecting unit detects loss of power supply input, if the IGN input detecting unit 17 detects the on state of the engine (ACC on or IGN on), or if the timer circuit counts a predetermined time (for example, every one hour), the corresponding circuit that is always active even in the power saving mode generates an interrupt to the CPU to switch the vehicle-mounted device 1 from the power saving mode to the normal mode. Because the relay input/output unit is always supplied with power even in the power saving mode, the state of the external relay 20 can be always kept.

<Wireless Communication Module>

As previously mentioned, in the normal mode, the vehicle-mounted device 1 acquires vehicle information and transmits the vehicle information to the server 3 at predetermined intervals, for example, every 30 seconds, or at the time of occurrence of a certain event such as when the vehicle power is turned on, or both. When the corresponding circuit that is always active generates an interrupt to the CPU to switch the vehicle-mounted device 1 from the power saving mode to the normal mode, the vehicle-mounted device 1 originates communication with the server 3 to receive a relay control command or transmit vehicle information. In the normal mode, in addition to communication originating from the vehicle-mounted device 1, the server 3 may originate communication, and the vehicle-mounted device 1 can receive information such as a relay control command. When a radio wave condition is poor, communication may be retried multiple times, for example, five times until communication is established. Even when the radio wave condition is poor and communication fails to be established, the vehicle-mounted device 1 can operate independently, because the vehicle-mounted device 1 stores a relay control command received from the server 3 in the latest communication in the memory. Furthermore, because the acquired vehicle information is stored in the memory, the vehicle-mounted device 1 can transmit the acquired information altogether to the server 3 when the communication line is recovered. It is also possible to prevent transmission or reception of the relay control command corresponding to the starting-disabled state when the radio wave condition is poor. This configuration can avoid the problem of being unable to change from the starting-disabled state to the starting-enabled state because of a poor radio wave condition.

Figure 5:
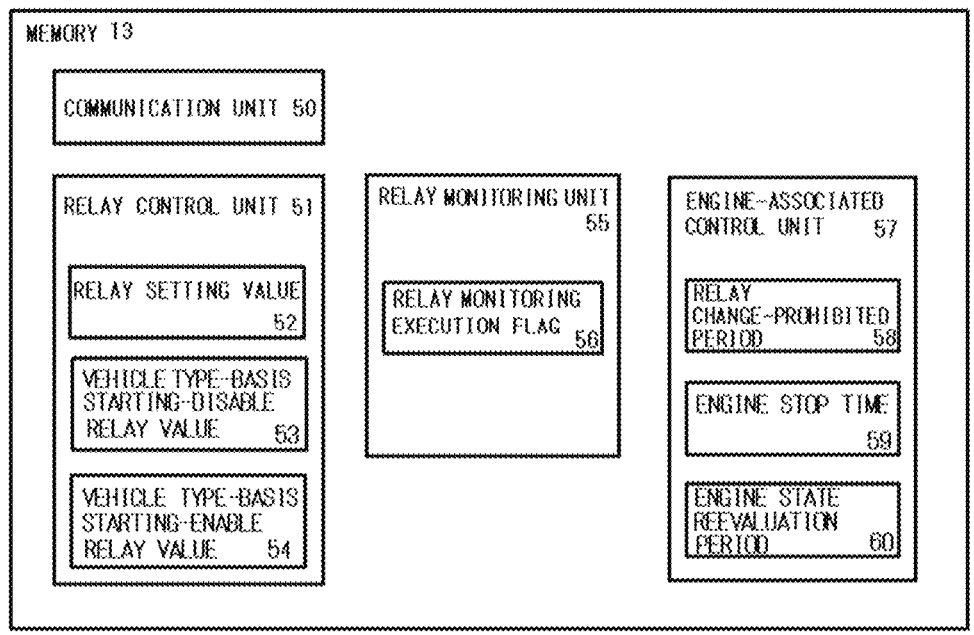
FIG. 5 is an illustration of the configuration in a memory.

A configuration in the memory 13 is now described with reference to FIG. 5. The memory 13 includes four process units: a communication unit 50, a relay control unit 51, a relay monitoring unit 55, and an engine-associated control unit 57. The relay control unit 51 includes a relay setting value 52, a vehicle type-basis starting-disable relay value 53, and a vehicle type-basis starting-enable relay value 54. The relay monitoring unit 55 includes a relay monitoring execution flag 56. The engine-associated control unit 57 includes a relay change-prohibited period 58, an engine stop time 59, and an engine state reevaluation period.

The communication unit 50 is a data region for communication with the server 3 and is used for transmission of vehicle information to the server 3 and reception of a relay control command from the server 3 through the wireless communication module 12. The relay control unit is a data region for changing the external relay 20 to a state corresponding to the relay value provided by the relay control command from the server 3. The relay monitoring unit 55 periodically monitors the state of the external relay 20, based on the relay state value of the starting-disabled state/starting-enabled state set as will be described later, in a situation in which the relay state should be the starting-enabled state, that is, the initial state, or when the last relay change request from the server 3 is to change to the starting-enabled state. As a result of the monitoring, if the external relay 20 is in a relay state other than the starting-enabled state, the state is changed to the starting-enabled state. The engine-associated control unit 57, receiving a relay control command from the server 3, ignores the relay control command if the engine is on for the past X minutes (for example, two minutes), and changes the relay to the starting-enabled state if the engine on is detected for Y seconds (for example, five seconds) after a relay control command for the starting-disabled state is executed.

Here, the ground for setting X minutes to, for example, two minutes will be described. The vehicle-mounted device 1 is switched to the power saving mode 10 minutes or so after the engine stops to suppress consumption of electric power. In the state of the power saving mode, when the user gets into the vehicle, inserts the key into the cylinder to start the engine, and turns the ignition into the on state, the IGN input detecting unit 17 detects that the engine is turned into the on state from the running state identification line (ACC line, IGN line) 22 and generates an interrupt to the CPU 11 to switch the vehicle-mounted device 1 to the normal mode. It takes about one minute when the radio wave condition is good, and takes about one minute and thirty seconds when the communication has to be retried five times or so because of a poor radio wave condition, until the server 3 recognizes that the vehicle-mounted device 1 has been switched to the normal mode. A relay control command to give an instruction to switch to the starting-disabled state is not employed (ignored) for a certain period after the power of the vehicle is turned off, thereby preventing the vehicle from improperly switching to the starting-disabled state when the power of the vehicle is turned on again immediately after the power of the vehicle is turned off. For example, it is possible to prevent the vehicle from improperly switching to the starting-disabled state in a case where while baggage is unloaded from the trunk or seat in a parking area, the vehicle is temporarily stopped at a position slightly displaced from the parking space, with the power of the vehicle turned off, and after unloading of baggage, the vehicle is pulled into the parking space by turning on the power of the vehicle again. Conversely, when X minutes are too long, the vehicle may be unable to be switched to the starting-disabled state in some cases. Given this, it is determined that the relay control command is ignored when the engine is on for the past two minutes.

The ground for setting Y seconds to, for example, five seconds will now be described. When a relay control command is received while the power of the vehicle is on, the vehicle-mounted device 1 does not accept a relay control command (ignores a relay control command), considering the safety. While the power of the vehicle is on, the user is moving on the vehicle. Thus, improper switching of the vehicle to the starting-disabled state is prevented, for example, when reception of a relay control command to change the vehicle to the starting-disabled state is delayed due to a poor radio wave condition. On the other hand, it takes about three seconds until the vehicle-mounted device 1 recognizes the starting of the vehicle after the vehicle is actually started. If the vehicle-mounted device 1 receives a relay control command immediately after the vehicle is started, the vehicle-mounted device 1 determines that the vehicle is not started and then employs the relay control command, so that the vehicle is switched to the starting-disabled state although the vehicle is started. As will be described later, when the ignition switch is a push button switch, the starting-disabled state is set by invalidating the push button or by activating the immobilizer (cutting the line for authentication). Of these methods, in the case of invalidating the push button, if switching to the starting-disabled state occurs in the three seconds, the engine is unable to be turned off. On the other hand, in the case of activating the immobilizer, if switching to the starting-disabled state occurs in the three seconds, the push button works to allow the engine to be turned off but the gear lever will not move into Drive. Based on the foregoing, three seconds plus a margin, that is, five seconds are employed as Y seconds.

The variables of the memory 13 illustrated in FIG. 5 will now be described. The relay setting value 52 is a relay value corresponding to the present state of the external relay 20. The vehicle type-basis starting-disable relay value 53 is a setting value for each vehicle type corresponding to the state of the external relay 20 for setting the vehicle to the starting-disabled state. The vehicle type-basis starting-enable relay value 54 is a setting value for each vehicle type corresponding to the state of the external relay 20 for setting the vehicle to the starting-enabled state. The relay monitoring execution flag 56 is a flag for determining whether to execute monitoring of the external relay 20 and is turned on in the initial state (at the time of shipment of the vehicle) or when the last relay control command from the server 3 is to change to the starting-enabled state. The relay change-prohibited period is a period (X minutes, for example, two minutes) during which change of the external relay 20 is prohibited after the engine is stopped. The engine stop time is the time when the previous engine stop is detected. The engine state reevaluation period is a period (Y seconds, for example, five seconds) during which the engine on is reevaluated after the control to set the starting-disabled state is performed.

One of the vehicle type-basis starting-disable relay value 53 and the vehicle type-basis starting-enable relay value 54 may be stored according to the type of the vehicle, or values of different vehicle types may be stored in advance and one of them may be selected according to the type of the vehicle. The vehicle type-basis starting-disable relay value 53 and the vehicle type-basis starting-enable relay value 54 may be set from the console 14 or may be set from the server 3. In terms of fail-safe for noise, it is preferable that the relay values are set from the server 3.

Figure 6:
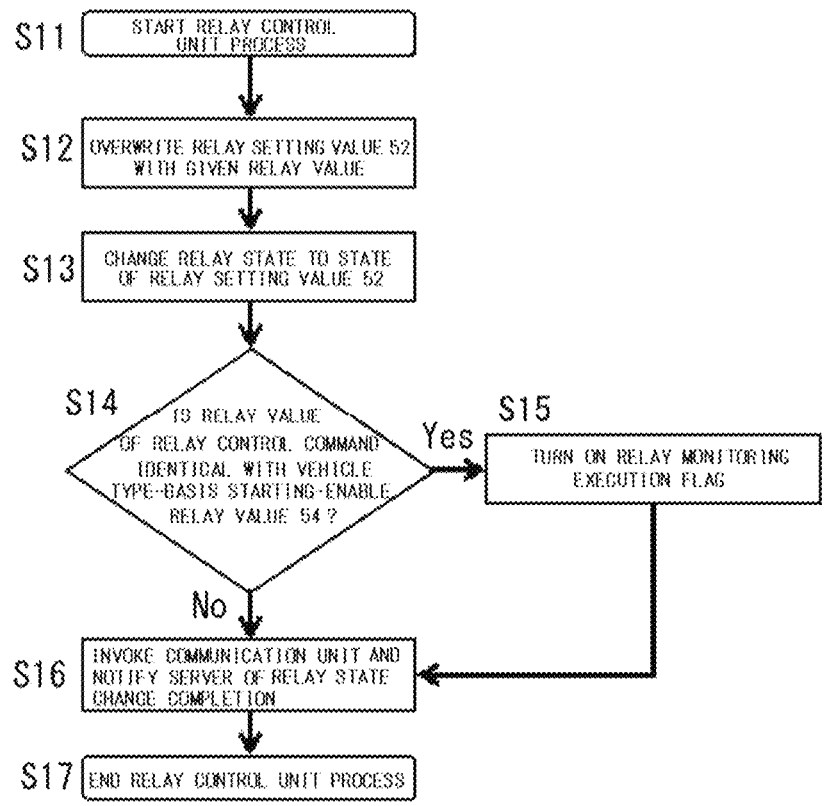
FIG. 6 is a flowchart of a relay control unit.
Figure 7:
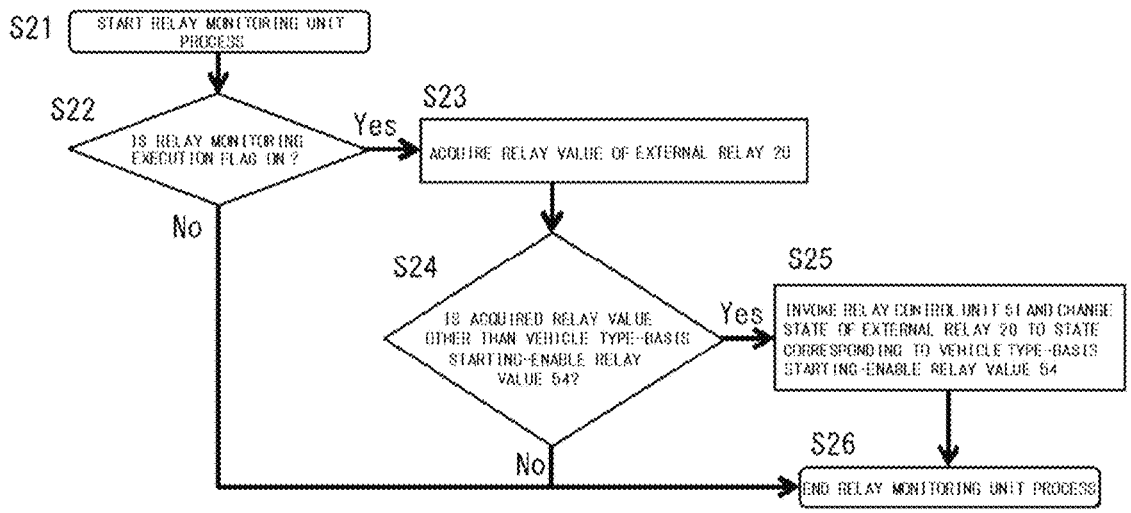
FIG. 7 is a flowchart of a relay monitoring unit.
Figure 8:
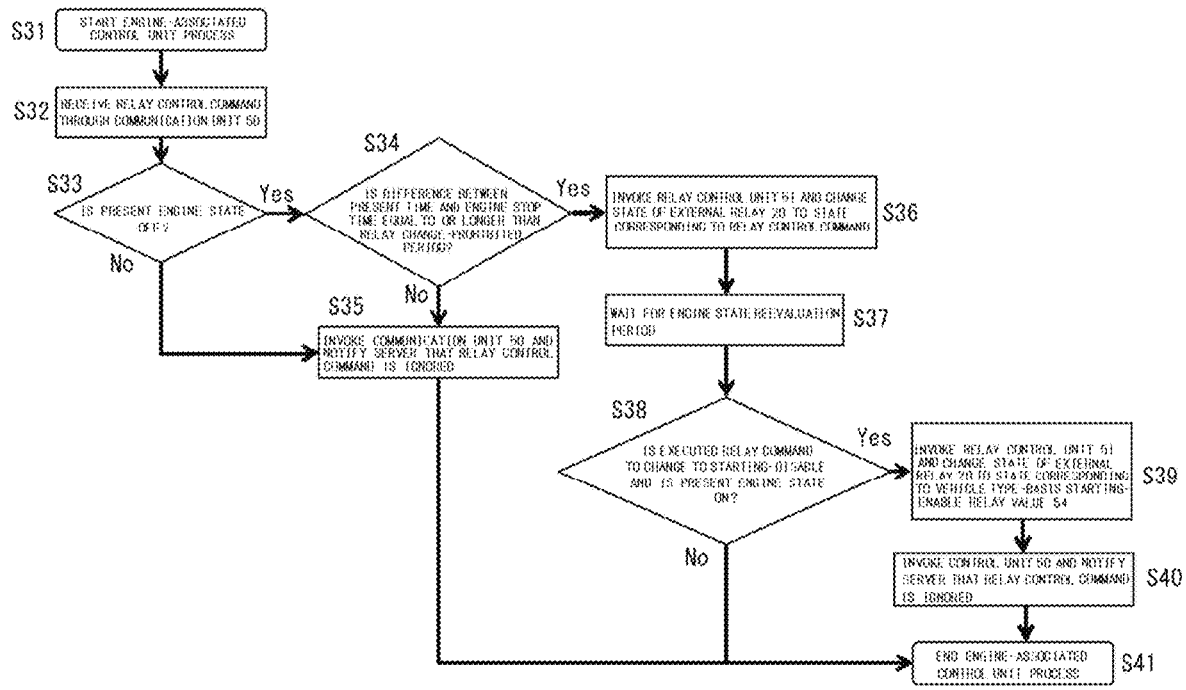
FIG. 8 is a flowchart of an engine-associated control unit.

The operation of each process units of the memory 13 will now be described with reference to the flowcharts in FIG. 6 to FIG. 8. First, the operation of the relay control unit 51 is described with reference to FIG. 6. When the relay control unit process is started in S11, first, in S12, the relay setting value 52 is overwritten with the given relay value. Next, in S13, the relay state is changed to the state of the relay setting value 52. Then, in S14, it is determined whether the relay value of the relay control command is identical with the vehicle type-basis starting-enable relay value 54. If Yes, the process proceeds to S15 to turn on the relay monitoring execution flag 56, and then proceeds to S16. If No in the determination in S14, the process proceeds to S16 to invoke the communication unit and notify the server 3 that the relay state change is completed. Subsequently, in S17, the relay control unit process ends. The relay control unit 51 is invoked in S25 of the relay monitoring unit 55 in FIG. 7 described later and in S36 of the engine-associated control unit 57 in FIG. 8 described later to start processing.

The operation of the relay monitoring unit is now described with reference to FIG. 7. When the relay monitoring unit process is started in S21, first, in S22, it is determined whether the relay monitoring execution flag 56 is on. As described above, the relay monitoring execution flag 56 is a flag for determining whether to execute monitoring of the external relay 20 and is set on in the initial state (at the time of shipment of the vehicle) or when the last relay control command from the server 3 is to change to the starting-enabled state. If the determination in S22 is Yes, the process proceeds to S23 and, after the relay state of the external relay 20 is acquired, proceeds to S24. On the other hand, if the determination in S22 is No, the process proceeds to S26 to terminate the relay monitoring unit process. In S24, it is determined whether the relay value acquired in S23 is a value other than the vehicle type-basis starting-enable relay value 54. If Yes, the process proceeds to S25 to invoke the relay control unit 51. After the relay setting value 52 is overwritten with the vehicle type-basis starting-enable relay value 54 corresponding to the starting-enabled state, the state of the external relay 20 is changed to the state corresponding to the vehicle type-basis starting-enable relay value 54. After that, the process proceeds to S26 to terminate the relay monitoring process. On the other hand, if No in the determination in S24, the process proceeds to S26 to terminate the relay monitoring process.

The operation of the relay monitoring unit is periodically performed, for example, every 30 seconds in the normal mode, every hour in the power saving mode. With this operation of the relay monitoring unit, in the supposed-to-be starting-enabled state (when the relay monitoring flag is on), the external relay 20 can be controlled such that the vehicle always enters the starting-enabled state, even when the memory 13 is rewritten with a numerical value different from the original numerical value due to a malfunction of firmware of the vehicle-mounted device. This control can prevent the vehicle from unintentionally entering the starting-disabled state and disturbing legitimate use of the vehicle. For example, even when the value of the relay setting value 52 in the memory 13 is rewritten with an unintended value due to a malfunction of firmware of the vehicle-mounted device, the external relay 20 is controlled such that the vehicle always enters the starting-enabled state when the relay monitoring execution flag is on, thereby keeping the vehicle in the starting-enabled state.

The operation of the engine-associated control unit 57 is now described with reference to FIG. 8. When the engine-associated control unit process is started in S31, the process proceeds to S32 to receive a relay control command through the communication unit 50. The process then proceeds to S33 to determine whether the present engine state is off. If the determination in S33 is Yes, the process proceeds to S34. In S34, it is determined whether the difference between the present time and the engine stop time is equal to or longer than the relay change-prohibited period 58 (X minutes). If the determination in S33 is No and the determination in S34 is No, the process proceeds to S35 to invoke the communication unit 50 and notify the server 3 that the relay control command is ignored. Subsequently, the process proceeds to S41 and the process of the engine-associated control unit ends. If the determination in S34 is Yes, the process proceeds to S36 to invoke the relay control unit 51 and change the state of the external relay 20 to the state corresponding to the relay control command. The process then proceeds to S37. In S37, the process waits for the engine state reevaluation period 60 (Y seconds) and then proceeds to S38. In S38, it is determined whether the executed relay control command is to change to the starting-disabled state and the present engine state is on. If the determination in S38 is Yes, the process proceeds to S39. In S39, the relay control unit 51 is invoked, and the state of the external relay 20 is changed to the state corresponding to the vehicle type-basis starting-enable relay value 54. Subsequently, the process proceeds to S40. In S40, the communication unit 50 is invoked, and the server 3 is notified that the relay control command is ignored. The process then proceeds to S41 and the process of the engine-associated control unit ends. On the other hand, If the determination in S38 is No, the process goes on to S41 and the process of the engine-associated control unit ends.

The operation of the engine-associated control unit 57 is performed periodically, for example, every 30 seconds in the normal mode and every hour in the power saving mode. In S35 and S40, the communication unit 50 is invoked and the server 3 is notified that the relay control command is ignored. The server 3, which receives the notification that the relay control command has been ignored, repeatedly transmits a relay control command until a notification of the relay state change completion is given in S16 in FIG. 6. This operation of the engine-associated control unit 57 can prevent the vehicle from entering the starting-disabled state in a dangerous place or in a place where the vehicle obstructs people, considering safety of the vehicle, when the vehicle is to be changed to the starting-disabled state under an instruction from the server. With the relay change-prohibited period 58 (X minutes, for example, two minutes) taken into consideration, it is possible to prevent the vehicle from improperly switching to the starting-disabled state even when the power of the vehicle is turned on again immediately after the power of the vehicle is turned off. In addition, with the engine state reevaluation period 60 (Y seconds, for example, five seconds) taken into consideration, the relay control command is not employed (the relay control command is ignored) when the vehicle-mounted device 1 receives a relay control command corresponding to the starting-disabled state immediately after the power of the vehicle is turned on (within Y seconds), thereby preventing the problem of switching to the starting-disabled state when the power of the vehicle is on.

Second Embodiment

In the first embodiment described above, the vehicle remote control system is applied to an internal combustion engine vehicle and makes a switch to the starting-disabled state by cutting off the engine starting control line (ST line) of the internal combustion engine using the external relay. In the following, an embodiment of the vehicle remote control system is described with reference to FIG. 9, which is applied to a vehicle using power other than an internal combustion engine, for example, an electric vehicle (hereinafter referred to as "EV") or a hybrid electric vehicle (hereinafter referred to as "HEV") and includes control other than the ST line control to make a switch to the starting-disabled state.

FIG. 9 illustrates a control method for the starting-disabled state. In FIG. 9, the kinds of vehicles are classified into internal combustion engine vehicle, EV, parallel HEV, series HEV, and series-parallel HEV, also classified according to whether an immobilizer is equipped, and further classified into a key type and a push type according to the starting method. FIG. 9 then illustrates which of three methods: method A, method B, and method C can be applied as the control method for the starting-disabled state. As the three control methods, the method A is cutting the ST line, the method B is disabling key authentication, and the method C is invalidating the push button.

The key type and the push type are classification according to the operation method for starting the power. The key type refers to the method in which a key is inserted into the key cylinder to start the power and switch between OFF, ACC, IGN, and START. The push type refers to the method for the smart key type, in which the power-starting push button is pushed to turn on the power.

The HEV is defined as follows. The parallel system is a system that drives wheels with a motor and an engine and charges a battery using the motor. The series system is a system that drives an electric generator with an engine for charging and drives wheels with a motor. The series-parallel system is a system that drives wheels with a motor and an engine and drives an electric generator with the engine for charging to drive the motor.

Here, the configuration of the vehicle-mounted device 1 for either an EV or an HEV has many parts common to those for an internal combustion engine vehicle illustrated in FIG. 2 but differs from the configuration for an internal combustion engine vehicle in that the EV does not include an internal combustion engine and the HEV has a mode of running with the motor alone. In the case of an EV, it is desirable to provide means for detecting that the push button is pushed and the power is on, instead of the IGN input detecting unit 17, and the external relay 20 may be replaced by electronic means, as will be described later. In the case of an HEV, it is desirable to provide means for detecting that the power is on, instead of the IGN input detecting unit 17, and the external relay 20 may be replaced by electronic means, as will be described later.

The three control methods, namely, the method A, the method B, and the method C will be described in detail below. The wiring for inserting the external relay 20 varies depending on the methods, but in any of the methods, starting the power is impossible in the starting-disabled state, and starting the power is possible in the starting-enabled state.

The method A is the method described in the first embodiment. In this method, the engine starting control line (ST line) of the internal combustion engine is cut off using the external relay 20 to make a switch to the starting-disabled state and can be applied to the internal combustion engine vehicle. In the method A, the external relay 20 is inserted to the ST line, and power supply to the starter motor is interrupted by opening the external relay 20 in the starting-disabled state, thereby preventing the starting of the engine.

The method B is a method employed by a vehicle equipped with an immobilizer. An immobilizer is a device that allows the engine to start only when authentication is successful. More specifically, a unique ID code is recorded in an IC chip called a transponder embedded in a key, and the ID code of the transponder is authenticated by the ID code registered in the electronic control device of the vehicle body. In the method B, the external relay 20 is inserted to the signal line for the ID code on the transponder side received by the vehicle from the transponder in the immobilizer or the signal line for the ID code on the vehicle side in the immobilizer, and the external relay 20 is open in the starting-disabled state, so that authentication of the ID code has failed, and therefore the engine is unable to be started in the starting-disabled state. Here, the external relay 20 is used to set the starting-disabled state. However, any means may be used as long as the authentication of the ID code has failed in the starting-disabled state, and, for example, electronic means may be used. When electronic means is used, it is also desirable that whether the state is the starting-disabled state or the starting-enabled state can be detected by the relay input/output unit 18 (see FIG. 2).

The method C is a method applied to a vehicle with a power-starting push button in a case of the smart key type. A smart key-type vehicle does not have a key cylinder for starting the power and starts the power by notifying the electronic control device that the push button is pushed. For example, a key-type EV does not exist and all EVs are of the push type. In the method C, the external relay 20 is inserted to the wiring for the push button, and the external relay 20 is open in the starting-disabled state, so that the power is not turned on by operating the push button in the starting-disabled state. Here, an example in which the external relay 20 is used to set the starting-disabled state has been described. However, any means may be used that prevents the electronic control device from being notified that the push button is pushed in the starting-disabled state. For example, electronic means may be used. When electronic means is used, it is also desirable that whether the state is the starting-disabled state or the starting-enabled state can be detected by the relay input/output unit 18 (see FIG. 2).

In the case equipped with an immobilizer and of the key type, the method A or the method B is applicable for internal combustion engine vehicles, no EV is applicable, and the method B is applicable for all of parallel HEVs, series HEVs, and series-parallel HEVs.

In the case equipped with an immobilizer and of the push type, the method A, the method B, or the method C is applicable for internal combustion engine vehicles, the method B or the method C is applicable for EVs, the method B or the method C is applicable for all of parallel HEVs, series HEVs, and series-parallel HEVs.

In the case not equipped with an immobilizer and of the key type, the method A is applicable for internal combustion engine vehicles, no EV is applicable, and no methods support parallel HEVs, series HEVs, and series-parallel HEVs.

In the case not equipped with an immobilizer and of the push type, the method A or the method C is applicable for internal combustion engine vehicles, the method C is applicable for EVs, and the method C is applicable for parallel HEVs, series HEVs, and series-parallel HEVs.

The invention claimed is:

1. A vehicle-mounted device comprising a processor, wherein the processor is configured to:
  receive, from a server, a relay control command to make a switch between a starter-disabled state and a starter-enabled state of a vehicle;
  control an external relay configured to make a switch between the starter-disabled state and the starter-enabled state of the vehicle based on the relay control command without affecting a running state of a vehicle engine;
employ the relay control command to switch to the starter-disabled state, in response to determining that the running state of the engine is off and that the elapsed time since turning off of the running state of the vehicle engine is equal to or longer than a relay change-prohibited period,
wait for a vehicle power reevaluation period, in response to employing the relay control command to switch to the starter-disabled state, and
control the external relay to switch to the starter-enabled state, in response to determining that the running state of the vehicle engine is on after the vehicle power reevaluation period has elapsed; and
control the external relay in a stand-alone manner to switch from a starter-disabled state and a starter-enabled state without being based on the relay control command, in response to communication with the server failing to be established.

2. The vehicle-mounted device according to claim 1, wherein:
the external relay is connected to the vehicle and the processor; and
the external relay is configured to be insertable to any one of an engine starting control line of the vehicle, a signal line for an ID code on a transponder side received by the vehicle from a transponder in an immobilizer, a signal line for an ID code on the vehicle side in an immobilizer, and wiring of a push button for starting of the vehicle via a connector or directly.

3. The vehicle-mounted device according to claim 2, wherein
the external relay is configured to be capable of selecting whether to be used as a normally-open type or to be used as a normally-closed type by being changed a connection state;
the external relay is configured to be in the starter-disabled state, when the external relay is used as the normally-open type and when cut of a wiring of the vehicle-mounted device, pull out of a wiring of the vehicle-mounted device or a failure of the vehicle-mounted device is detected; and
the external relay is configured to be in the starter-enabled state, when the external relay is used as the normally-closed type and when cut of a wiring of the vehicle-mounted device, pull out of a wiring of the vehicle-mounted device or a failure of the vehicle-mounted device is detected.

* * * * *